US009625646B2

(12) United States Patent
Molin et al.

(10) Patent No.: US 9,625,646 B2
(45) Date of Patent: Apr. 18, 2017

(54) BEND-INSENSITIVE MULTIMODE OPTICAL FIBER WITH REDUCED IMPACT OF LEAKY MODES

(71) Applicant: DRAKA COMTEQ BV, HJ Amsterdam (NL)

(72) Inventors: Denis Molin, Draveil (FR); Marianne Bigot-Astruc, Marcoussis (FR); Pierre Sillard, Le Chesnay (FR); Franciscus Johannes Achten, Em Tilburg (NL)

(73) Assignee: DRAKA COMTEQ BV, Amsterdam (NL)

( * ) Notice: Subject to any disclaimer, the term of this patent is extended or adjusted under 35 U.S.C. 154(b) by 0 days.

(21) Appl. No.: 14/901,272

(22) PCT Filed: Jun. 26, 2013

(86) PCT No.: PCT/EP2013/063417
§ 371 (c)(1),
(2) Date: Dec. 28, 2015

(87) PCT Pub. No.: WO2014/206464
PCT Pub. Date: Dec. 31, 2014

(65) Prior Publication Data
US 2016/0147013 A1    May 26, 2016

(51) Int. Cl.
*G02B 6/28*  (2006.01)
*G02B 6/36*  (2006.01)
(Continued)

(52) U.S. Cl.
CPC ......... *G02B 6/0365* (2013.01); *G02B 6/0281* (2013.01); *G02B 6/0288* (2013.01)

(58) Field of Classification Search
CPC ... G02B 6/0365; G02B 6/0281; G02B 6/0288
See application file for complete search history.

(56) References Cited

U.S. PATENT DOCUMENTS 8,977,092 B2 * 3/2015 Bickham ............ G02B 6/0288
385/124
9,052,435 B2 * 6/2015 Zhang ..................... G02B 6/02
(Continued)

FOREIGN PATENT DOCUMENTS

EP          2299302 A1    3/2011
JP       2006047719       2/2006

OTHER PUBLICATIONS

International Search Report dated Jan. 29, 2014 for corresponding International Application No. PCT/EP2013/063417, filed Jun. 26, 2013.
(Continued)

*Primary Examiner* — Omar R Rojas
(74) *Attorney, Agent, or Firm* — David D. Brush; Westman Champlin & Koehler, P.A.

(57) ABSTRACT

A multimode optical fiber is provides, which includes an optical core and an optical cladding surrounding the optical core. The optical core has a refractive graded-index profile. The optical cladding includes: an inner layer surrounding the optical core, an intermediate layer, called a "depressed trench", surrounding the inner layer, and an outer layer surrounding the depressed trench and having a constant refractive index. The depressed trench has a width W and a negative refractive index difference $\Delta n_t$ with respect to the outer layer, and is designed so as to satisfy the following inequality:

$|0.585677 - 114.681 \times S + 13.7287 \times S^2 + 18.7343 \times S \times W - 4.61112 \times S \times \Delta n_t.10^3 - 0.913789 \times W \times \Delta n_t.10^3| + 2 \times W \times \Delta n_t.10^3 < -30$ wherein: S is the width of the inner cladding, which is included between 0.6 μm and 1.6 μm; $\Delta n_t$ is included between $-11.10^{-3}$ and $-4.10^{-3}$; and $W \times \Delta n_t.10^3$ is lower than $-25$ μm.

15 Claims, 2 Drawing Sheets

(51) Int. Cl.
G02B 6/036 (2006.01)
G02B 6/028 (2006.01)

(56) References Cited

U.S. PATENT DOCUMENTS

| | | |
|---|---|---|
| 2008/0166094 A1 | 7/2008 | Bookbinder et al. |
| 2009/0154888 A1 | 6/2009 | Abbott, III et al. |
| 2010/0067858 A1 | 3/2010 | Kim et al. |
| 2011/0058781 A1* | 3/2011 | Molin .................. G02B 6/0288 385/126 |
| 2011/0123161 A1 | 5/2011 | Molin et al. |
| 2013/0028564 A1 | 1/2013 | Molin et al. |

OTHER PUBLICATIONS

International Preliminary Report on Patentability and Written Opinion dated Dec. 29, 2015 for International Application No. PCT/EP2013/063417, filed Jun. 26, 2013.

* cited by examiner

BEND-INSENSITIVE MULTIMODE OPTICAL FIBER WITH REDUCED IMPACT OF LEAKY MODES

CROSS-REFERENCE TO RELATED APPLICATIONS

This application is a Section 371 National Stage Application of International Application No. PCT/EP2013/063417, filed Jun. 26, 2013, the content of which is incorporated herein by reference in its entirety, and published as WO 2014/206464 A1 on Dec. 31, 2014, in English.

FIELD OF THE DISCLOSURE

The invention relates to fiber optic transmission, and, more specifically, to a bend-insensitive multimode optical fiber having a reduced number of leaky modes.

BACKGROUND OF THE DISCLOSURE

An optical fiber is conventionally constituted of an optical core, which transmits an optical signal, and of an optical cladding, which confines the optical signal within the optical core. To that end the refractive index of the core, $n_c$, is greater than the one of the cladding, $n_g$. An optical fiber is generally characterized by a refractive index profile that associates the refractive index n with the radius r of the optical fiber: the distance r with respect to the center of the optical fiber is shown on x-axis and the difference $\Delta n$ between the refractive index at radius r and the refractive index of the optical cladding is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes are cut-off or highly attenuated.

Multimode fibers are commonly used for short-distance applications requiring a high bandwidth, such as local area networks (LANs) and multi-dwelling units (MDUs), more generally known as in-building networks. The core of a multimode fiber typically has a diameter of 50 μm, or 62.5 μm and an alpha refractive graded-index profile. In such applications, the conventional optical fibers can be subjected to unintended bending, which can cause inherent losses and thus modify the mode power distribution and the bandwidth thereof.

The key parameters that ensure good performances of multimode fibers in multi-gigabit Ethernet communications are the bend-loss resistance and the bandwidth.

A known solution to improve bend-loss resistance of multimode fibers consists in adding a depressed-index portion between the graded-index core and the cladding. This depressed-index portion, usually called a depressed trench, has a negative refractive index difference with respect to the optical fiber cladding, and its position and size are designed so as to avoid degradation of the bandwidth.

However, while the presence of a depressed trench improves the bend-loss resistance of the guided optical modes, it also leads to additional parasitical modes, called "leaky modes", to co-propagate with the guided optical modes. Optical rays being partially reflecting at the depressed trench interface, the leaky modes exhibit additional losses (commonly called "leakage losses") compared to the guided optical modes coming from the refractive index profile itself.

The leaky modes are also present within a conventional multimode fiber, i.e. a multimode fiber having no bend-loss resistance means, but they are nearly inexistent in practice, because the level of their leakage losses is extremely high. On the other hand, with a known trench-assisted design of optical fiber, the leakage losses of the leaky modes are so reduced that the leaky modes propagate over several meters and even more, that is critical for compatibility with a conventional multimode fiber. Under OFL (OverFilled Launch) conditions, it was indeed found that the emergence of leaky modes disturbs the characterization measurements, the core size (a) and numerical aperture (NA) measurements being in particular overestimated. This is problematic because the interconnection between fibers requires tight tolerances.

It would be therefore efficient to provide a multimode optical fiber having a limited impact of the leaky modes on the optical characteristics (like the core size and numerical aperture) and still providing a bend-loss resistance, while allowing a broad modal bandwidth.

The patent documents US 2009/0154888, US 2008/0166094, JP 2006/47719, US 2011/0123161, US 2010/0067858, for examples, relate to a graded index optical fiber having a depressed trench within the cladding for reducing bending losses. However, none of these documents discloses a solution to overcome the problem of impact of the leaky modes on the optical characteristics.

The patent document US 2011/058781 also relates to a trench-assisted multimode optical fiber. This document proposes to enhance the bend-loss resistance of the optical fiber by defining the volume of the depressed trench as being comprised between −40 μm and −30 μm. This invention gives a rule that limits the deleterious effect of the leaky modes on the numerical aperture (i.e. on the divergence of light spot output the optical fiber) but does not provide any solution for minimizing the impact on other optical characteristics, like the optical core size for instance. Indeed, the leaky mode leads to an artificial core size enlargement during characterization measurements (the core looks larger than it actually is). Thus, this known solution is not optimal.

SUMMARY

In one particular embodiment of the invention, it is proposed a multimode optical fiber comprising an optical core and an optical cladding surrounding the optical core, the optical core having a refractive graded-index profile, the optical cladding comprising:

an inner layer surrounding said optical core, an intermediate layer, called "depressed trench", surrounding said inner layer, an outer layer surrounding said depressed trench and having a constant refractive index, said depressed trench having a width W and a negative refractive index difference $\Delta n_t$ with respect to the outer layer.

The depressed trench according to the invention is arranged so as to satisfy the following inequality:

$$|0.585677 - 114.681 \times S + 13.7287 \times S^2 + 18.7343 \times S \times W - 4.61112 \times S \times \Delta n_t.10^3 - 0.913789 \times W \times \Delta n_t.10^3| + 2 \times W \times \Delta n_t.10^3 < -30$$

wherein:

S is the width of the inner cladding, which is comprised between 0.6 μm and 1.6 μm;

$\Delta n_t$ is comprised between $-11.10^{-3}$ and $-4.10^{-3}$;

$W \times \Delta n_t.10^3$ is lower than −25 μm.

The general principle is to propose a multimode optical fiber comprising a depressed trench within the optical cladding with an index profile optimized for limiting the impact of the leaky modes on the optical characteristics, while having a high bend-loss resistance. To that end, the values of the inner cladding width S, of the trench width W and the trench index difference $\Delta n_t$ (also called "trench depth") shall be adequately chosen to satisfy both the inequality and conditions described above.

First of all, in order to limit the impact of leaky modes, the inner cladding width S, the trench width W and the trench depth $\Delta n_t$ shall satisfy said inequality: it corresponds to an acceptance criterion representative to the impact level of the leaky modes on optical characteristics of the optical fiber. Then, the condition on the inner cladding width S is used to enable the multimode optical fiber to have a high modal bandwidth achievement. The condition on the trench parameter $\Delta n_t$ is used for large scale production and implementation of optical fibers. Finally, the condition on the product $W \times \Delta n_t.10^3$ is used to have bending losses as low as possible.

The astute implementation of such depressed trench-assisted optical fiber leads to a trade-off between negative effect of leaky modes and bending losses which is better than the one of prior art optical fibers, while keeping a broad modal bandwidth.

Reducing number of leaky modes propagating within the optical fiber means reducing disturbances in characterization measurements of the multimode optical fibers. The result is in particular a more accurate estimation of measurements of optical core size relative to prior art optical fibers (for which the optical core size are generally overestimated). The trench-assisted multimode fiber according to the invention therefore guarantees a better compatibility with the conventional multimode fibers (free of depressed trench).

In addition, an optical fiber according to the invention is simple to manufacture and costs little, since all that is needed is to adapt doping of the different parts of the optical cladding as a function of the refractive index profile desired for the depressed trench.

Advantageously, the width S of the inner layer is comprised between 0.8 µm and 1.2 µm.

This range of values provides the multimode optical fiber with a high modal bandwidth, essential for short-distance applications.

According to one advantageous characteristic, the negative refractive index difference with respect to the outer layer is comprised between $-8.10^{-3}$ and $-4.10^{-3}$.

This range of values leads to further reduce bending losses. This is for best trade-off between bend resistance improvement and leaky mode resistance.

In an exemplary embodiment, the inner layer has a constant refractive index substantially equal to the refractive index of the outer layer.

In an alternative exemplary embodiment, which is more advantageous, the inner layer has a refractive index difference with respect to the outer layer which is comprised between about $-0.40 \times 10^{-3}$ and $2.00 \times 10^{-3}$, and more precisely between about $-0.27 \times 10^{-3}$ and $1.19 \times 10^{-3}$, and even more precisely between $-0.10 \times 10^{-3}$ and $0.60 \times 10^{-3}$.

This allows higher bandwidth multimode optical fibers.

Advantageously, the optical core's graded-index profile is an alpha graded-index profile, which can be defined as follow:

$$n(r) = n_0 \cdot \sqrt{1 - 2 \cdot \Delta \cdot \left(\frac{r}{a}\right)^\alpha} \text{ for } r < a$$

where:
a is the radius of the optical core;
$n_0$ is the maximal refractive index of the optical core (which generally corresponds to the index value of the center of the optical core, i.e. for r=0);
$1.9 \leq \alpha \leq 2.2$, $\alpha$ being a non-dimensional parameter that defines the graded-index profile shape of the optical core;

$$\Delta = \frac{n_0^2 - n_1^2}{2n_0^2},$$

$\Delta$ being the normalized refractive index difference and $n_1$ the minimal refractive index value of the optical core (which generally corresponds to the index value of the outer cladding).

The alpha refractive index profile of the optical core allows reducing intermodal dispersion. The parameter alpha ($\alpha$) is chosen so as to provide the largest bandwidth at the target operating wavelength, such as 850 nm or 1300 nm for example.

According to one advantageous characteristic, the optical core has a maximum refractive index difference $\Delta n_0$ with respect to the outer layer comprised between about $11 \times 10^{-3}$ and $18 \times 10^{-3}$, more precisely between about $13 \times 10^{-3}$ and $16 \times 10^{-3}$.

Advantageously, the outer end of said depressed trench is separated from the center of the optical fiber at a radius $r_t$ lower than 32 µm, and more precisely lower than 30 µm.

Preferentially, the multimode optical fiber has a numerical aperture comprised between 0.185 and 0.215 and the optical core has a radius a comprised between about 22 µm and 27 µm. Numerical aperture, hereafter called NA, is a dimensionless number that characterizes the range of angles over which the optical fiber can accept or emit light spot. It can be defined by the following equation: $NA=\sqrt{n_0^2-n_1^2}=n_0 \cdot \sqrt{2\Delta}$ In another embodiment, the invention pertains to an optical system comprising at least one multimode optical fiber described here above in any of its different embodiments. This multimode optical system may be an optical home network, such as a local area network (LAN) and or a multi-dwelling unit (MDU) for example.

BRIEF DESCRIPTION OF THE DRAWINGS

Other features and advantages of embodiments of the invention shall appear from the following description, given by way of an indicative and non-exhaustive examples and from the appended drawings, of which.

DETAILED DESCRIPTION OF ILLUSTRATIVE EMBODIMENTS

The general principle of the invention is to propose a multimode optical fiber that comprises a trench-assisted design allowing to limit the negative contribution of the leaky modes on the optical characteristics, in particular (but not exclusively) on the optical core size, while providing bend resistance and high modal bandwidth achievement.

Figure 1:
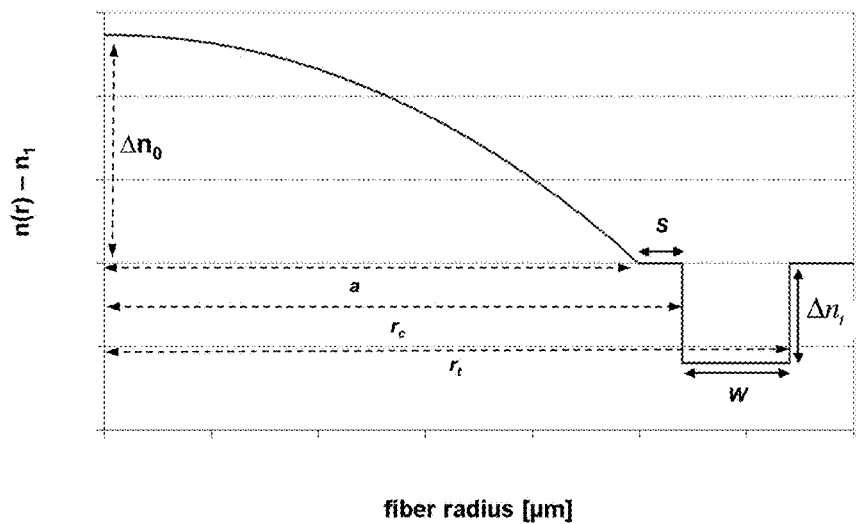
FIG. 1 graphically provides the refractive index profile of an optical fiber according to one embodiment of the invention.

FIG. 1 depicts the refractive index profile n(r) of an optical fiber according to one embodiment of the invention. It describes the relationship between the refractive index value n and the distance r from the center of the optical fiber.

The distance r with respect to the center of the optical fiber is shown on x-axis and the difference $n(r)-n_1$ between the refractive index at radius r and the refractive index of the outer cladding is shown on y-axis.

The fiber of the invention is a multimode optical fiber having an optical core (0<r<a) and an optical cladding (a≤r) surrounding the optical core.

The optical cladding especially comprises, from the center of the optical fiber to the periphery: an inner layer (hereafter called "inner cladding") surrounding the optical core, an intermediate layer (hereafter called "depressed trench") surrounding the inner cladding, an outer layer (hereafter called "outer cladding") surrounding the depressed trench.

The inner cladding directly surrounds the optical core. The end of the inner cladding is located at a radial distance $r_c$ from the center of the optical fiber. It further has a refractive index difference substantially equal to 0 with respect to the outer cladding, since it has a constant refractive index ($n_3$) which is substantially equal to the one of the outer cladding ($n_1$) such as: $n_1=n_0 \cdot \sqrt{1-2 \cdot \Delta}$.

The depressed trench directly surrounds the inner cladding. It is located between the inner cladding and the outer cladding at a radial distance between $r_c$ and $r_t$ from the center of the optical fiber. The depressed trench is characterized by three main parameters:

- a trench depth $\Delta n_t$ that corresponds to the negative refractive index difference with respect to the outer cladding ($n_1$);
- a trench width W that corresponds to the difference $r_t-r_c$ (expressed in micrometer); and
- a space S separating the beginning of the depressed trench from the end of the optical core, i.e. the difference $r_c-a$ (expressed in micrometer).

According to the invention, these trench parameters $\Delta n_t$, W, S are tuned so that they satisfy the following inequality:

$$|0.585677-114.681 \times S+13.7287 \times S^2+18.7343 \times S \times W-4.61112 \times S \times \Delta n_t.10^3-0.913789 \times W \times \Delta n_t.10^3|+2 \times W \times \Delta n_t.10^3 < -30$$

The inventors discovered that the left member of this inequality corresponds to an acceptance criterion representative to the impact level of the leaky modes on optical characteristics of the optical fiber. This acceptance criterion has been obtained through a generalized linear model based upon a set of data resulting from a simulation of optical core size after 2 meters of samples of trench-assisted multimode optical fibers and for which refractive index profiles exhibit various values of parameters S, W and $\Delta n_t$ as summarized in the Table 1 below.

The left member of the above inequality is called hereafter as "acceptance criterion".

In the context of experimentation carried out on multimode optical fibers, the inventors unexpectedly discovered that the bigger the depressed trench is, the greater the number of leaky modes propagate within the optical fiber, and so the greater the overestimation of the core size measurement is. Based on this principle, depressed trench-assisted optical fibers have been simulated with various values of parameters S, W and $\Delta n_t$ in order to establish a link between these parameters allowing to optimize the trade-off between bend resistance and impact of leaky modes inherent to the trench assistance concept.

According to an particular embodiment, these trench parameters $\Delta n_t$, W, S are further tuned so that they further satisfy the following conditions:
- S is comprised between 0.6 μm and 1.6 μm;
- $\Delta n_t$ is comprised between $-11.10^{-3}$ and $-4.10^{-3}$;
- the product $W \times \Delta n_t.10^3$ (hereafter called "trench volume") is lower than $-25$ μM.

TABLE 1

| S (μm) | W (μm) | Δnt (expressed in $10^{-3}$) | Over-estimation (μm) | W × Δn$_t$ × $10^3$ (μm) | Acceptance criterion |
|---|---|---|---|---|---|
| 0.89192 | 2.6 | −9.7851 | 0.4 | −25 | −35 |
| 0.73795 | 2.5 | −10.2382 | 0.3 | −26 | −35 |
| 0.68943 | 2.6 | −10.3826 | 0.4 | −27 | −35 |
| 0.64589 | 2.6 | −10.5123 | 0.4 | −27 | −35 |
| 0.60716 | 2.6 | −10.6276 | 0.4 | −28 | −35 |
| 0.57306 | 2.6 | −10.729 | 0.5 | −28 | −35 |
| 0.54353 | 2.7 | −10.817 | 0.5 | −29 | −35 |
| 0.51838 | 2.7 | −10.8919 | 0.5 | −29 | −35 |
| 0.49756 | 2.7 | −10.9539 | 0.5 | −30 | −35 |
| 0.62061 | 2.9 | −10.4238 | 0.5 | −30 | −35 |
| 0.50115 | 3.3 | −9.0589 | 0.6 | −30 | −34 |
| 0.20499 | 3.6 | −8.2694 | 0.6 | −30 | −33 |
| 0.48982 | 3.8 | −8.0059 | 0.6 | −30 | −32 |
| 0.95182 | 3.0 | −10.2323 | 0.7 | −30 | −31 |
| 0.67222 | 3.9 | −7.82 | 0.8 | −30 | −30 |
| 0.74906 | 3.9 | −7.7189 | 0.8 | −30 | −29 |

From this table, it should be noticed that the variation in measurements of the optical core size (called "overestimation" in the table) for an optical fiber of the invention subject to the OFL conditions does not exceed 0.8 μm. Generally speaking, to characterize a multimode optical fiber under OFL conditions, the optical fiber is subject to a spot of a light source coupled to thereon to equally excite all the guided and leaky modes. The near field pattern of the spot is then observed at the output of the optical fiber and post-processed to assess the optical core size. We observe here that, when values of parameters $\Delta n_t$, W, S are chosen so as to meet the acceptance criterion (i.e. lower than −30), the impact of leaky modes on the near field pattern is significantly reduced, thereby making the overestimation of optical core size measurements negligible (i.e. lower than 1.0 μm). Therefore, compared with the trench-assisted-optical fibers of prior art for which the core size overestimation usually tend to be higher than 1.0 μm, those of the invention lead to much more accurate characterisation measurements.

In order to keep a high bend-loss resistance at 5 mm bend radius, the depressed trench according to the invention is designed to have the trench volume ($W \times \Delta n_t.10^3$) lower than −25 μm. Indeed, as will be discussed more thoroughly below in relation with FIG. 3, simulations showed that the bending losses, as well as number of leaky modes, depend mainly on the trench volume of optical fiber.

The parameter S is chosen to allow tuning the modal bandwidth of the multimode optical fiber: S is comprised between 0.6 μm and 1.6 μm.

The trench depth $\Delta n_t$ is comprised between $-11.10^{-3}$ and $-4.10^{-3}$, and more preferably between $-8.10^{-3}$ and $-4.10^{-3}$. This value range allows large scale production and implementation of optical fibers.

By choosing appropriate values of parameters $\Delta n_t$, W, S while complying with the acceptance criterion, the invention thus offers a trench-assisted design that allows high bend-losses resistance, in addition to a reduced number of leaky modes.

As a strictly illustrative example, the optical core radius a is about 25 μm and the parameter α of the optical core's index profile is about 2. The optical core has a maximum refractive index difference $\Delta n_0$ with respect to the outer layer of about $14 \cdot 10^{-3}$ and a normalized refractive index difference $\Delta$ of about 1. The end of the inner cladding is located at a radial distance $r_c$ substantially equal to 27.5 μm from the center of the optical fiber. The depressed trench is located between the inner cladding and the outer cladding at a radial distance between $r_c$ and $r_t$ substantially equal to 31.5 μm from the center of the optical fiber. An is substantially equal to $-5.5 \times 10^{-3}$, S substantially equal to 1.5 μm and W substantially equal to 5 μm, representing a trench volume $W \times \Delta n_t \cdot 10^3$ of $-22$ μm. The trench's outer end is separated from the optical fiber's center of a radius $r_t$ of about 32 μm and the trench's inner end is separated from the optical fiber's center of a radius $r_c$ of about 27 μm.

In the particular embodiment illustrated in FIG. 1, the inner cladding has a standard constant refractive index that is substantially equal to the one of the outer cladding ($n_1 = n_0 \cdot \sqrt{1 - 2 \cdot \Delta}$). One might also envisage, in an alternative embodiment of the invention, that the inner cladding has a refractive index difference with respect to the outer cladding which can be comprised between approximately $-0.4 \times 10^{-3}$ and $2.0 \times 10^{-3}$. This refractive index difference, which is either negative or positive with respect to outer cladding, can be obtained by doping the inner cladding properly during manufacturing process. As an illustrative example, a positive refractive index difference of $0.5 \times 10^{-3}$ allows guarantying a broad modal bandwidth of the multimode fiber optical.

The advantages of the invention will be more evident by comparing optical fibers of the prior art with an exemplary optical fiber according to the invention.

Figure 2:
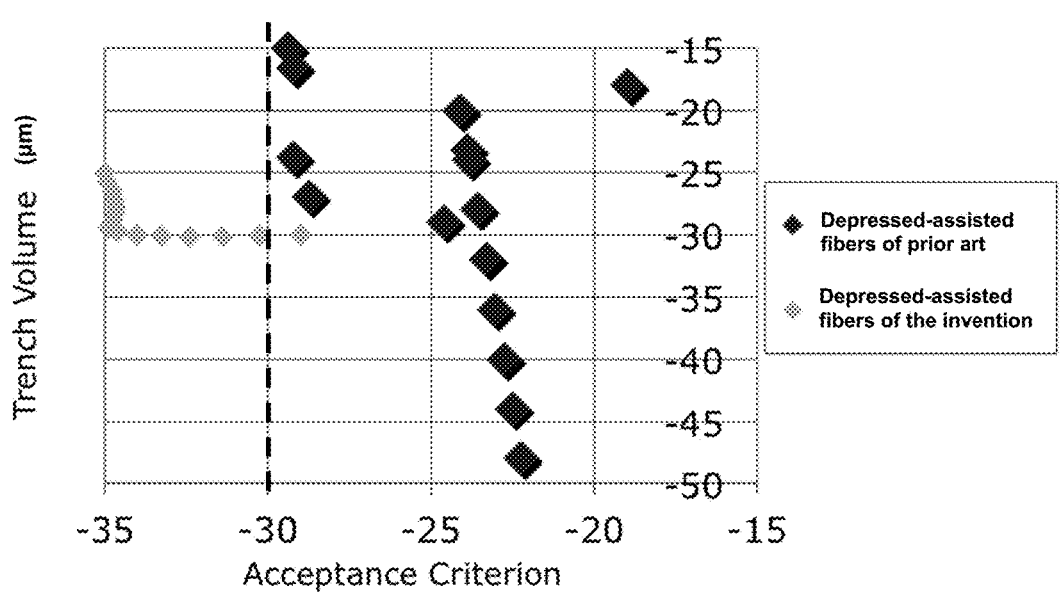
FIG. 2 shows a comparison between the depressed-assisted optical fiber of the invention and depressed-assisted optical fiber of prior art described above with reference to technological background, computed according to a linear model in accordance with the invention.

The graph of FIG. 2 depicts the depressed trench volume of trench-assisted optical fibers of prior art and of trench-assisted optical fibers of the invention as a function of the acceptance criterion of the invention (for which the principle is detailed above in relation with FIG. 1). The y-axis depicts values of the trench volume $W \times \Delta n_t \cdot 10^3$ from the table 1 illustrated above and the x-axis depicts different values of the acceptance criterion.

By comparing the acceptance criterion applied both to the trench-assisted optical fibers of prior art and optical fibers of the invention, the graph of FIG. 2 shows the quality of the model that leads to the establishment of the acceptance criterion according to the invention. In particular, it can be observed that none of the assisted-trench optical fibers of prior art does meet the acceptance criterion of the invention. Contrary to the invention, none of the optical fibers of prior art thereby offers a trench-assisted design that allows high bend-losses resistance, in addition to a reduced number of leaky modes.

Figure 3:
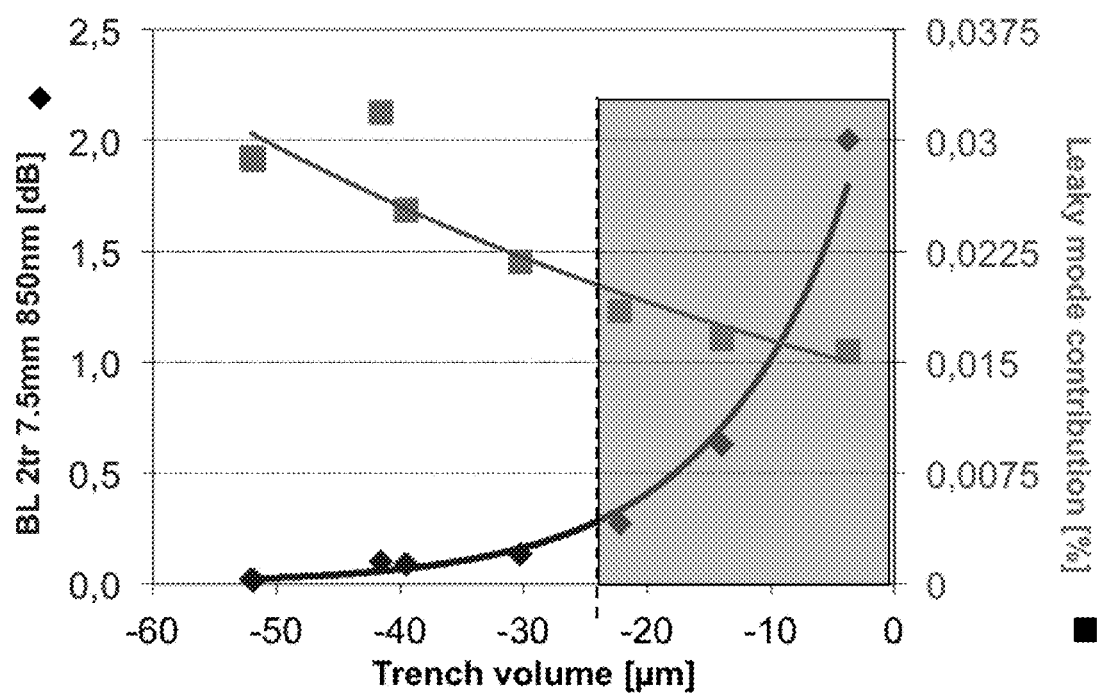
FIG. 3 graphically depicts bending sensitivity of optical fibers in accordance with the invention measured at a wavelength of 850 nm under launching conditions defined in the standard IEC 60793-1-47, as a function of the trench volume of these optical fibers.

FIG. 3 graphically depicts bending losses of optical fibers in accordance with the invention measured for 2 turns with 7.5 mm bend radius and at a wavelength of 850 nm, as a function of the trench volume of these optical fibers.

The left-hand y-axis depicts macro-bending losses or macro-bending sensitivity (expressed in dB) of a set of optical fibers measured at 850 nm under launching conditions defined in the standard IEC60793-1-47. The term "BL 2tr 7.5 mm 850 nm" refers to launching conditions under which measurements were made: optical fibers has been subject to a wavelength of 850 nm for 2 turns around a 7.5 mm bend radius mandrel. The trench volume $W \times \Delta n_t \cdot 10^3$ (expressed in μm) is depicted on the graph x-axis. A right-hand y-axis has further been added for depicting the relationship between the trench volume $W \times \Delta n_t \cdot 10^3$ and the leaky mode contribution (expressed in %) measured these optical fibers.

It can be seen that the trench-assisted multimode optical fibers according to the invention exhibit bending losses lower than 0.4 dB while having a leaky mode contribution relatively low, lower than 0.03%. The shaded area particularly indicates the optical fibers that do not meet the requirements of trench volume ($W \times \Delta n_t \cdot 10^3 \leq -25$ μm).

Therefore, this demonstrates that the multimode optical fibers in accordance with the invention offer an improved trade-off between bend resistance and leaky mode resistance.

Finally, in another embodiment, the invention pertains to an optical system comprising at least one portion of a multimode optical fiber described here above in any of its different embodiments. This multimode optical system may be an optical home network, such as a local area network (LAN) and or a multi-dwelling unit (MDU) for example.

At least one embodiment of the present disclosure overcomes one or more different drawbacks of the prior art.

At least one embodiment provides a multimode optical fiber that has a limited impact of the leaky modes on the optical characteristics, while providing a high bend-loss resistance and a broad modal bandwidth for multimode transmission.

At least one embodiment provides a multimode optical fiber that assures a trade-off between the leakage losses and bending losses which is better than the one of prior art optical fibers.

At least one embodiment provides a multimode optical fiber that is simple to manufacture and costs little.

Although the present disclosure has been described with reference to one or more examples, workers skilled in the art will recognize that changes may be made in form and detail without departing from the scope of the disclosure and/or the appended claims.

The invention claimed is:

1. A multimode optical fiber comprising:
an optical core; and
an optical cladding surrounding the optical core,
the optical core having a refractive graded-index profile,
the optical cladding comprising:
   an inner layer surrounding said optical core,
   an intermediate layer, called a "depressed trench", surrounding said inner layer,
   an outer layer surrounding said depressed trench and having a constant refractive index,
said depressed trench having a width W and a first negative refractive index difference $\Delta n_t$ with respect to the outer layer,
wherein said depressed trench is arranged so as to satisfy the following inequality:

$$0.585677 - 114.681 \times S + 13.7287 \times S^2 + 18.7343 \times S \times W - 4.61112 \times S \times \Delta n_t \cdot 10^3 - 0.913789 \times W \times \Delta n_t \cdot 10^3 | + 2 \times W \times \Delta n_t \cdot 10^3 < -30$$

wherein:
S is the width of the inner layer, which is comprised between 0.6 μm and 1.6 μm;
$\Delta n_t$ is comprised between $-11 \times 10^{-3}$ and $-4 \times 10^{-3}$; and
$W \times \Delta n_t \cdot 10$ is lower than $-25$ μm.

2. The multimode optical fiber according to claim 1, wherein the width S of the inner layer is comprised between 0.8 μm and 1.2 μm.

3. The multimode optical fiber according to claim 1, wherein the first negative refractive index difference $\Delta n_t$ with respect to the outer layer is comprised between $-8 \times 10^{-3}$ and $-4 \times 10^{-3}$.

4. The multimode optical fiber according to claim 1, wherein the inner layer has a constant refractive index substantially equal to the refractive index of the outer layer.

5. The multimode optical fiber according to claim 1, wherein the inner layer has a second refractive index difference with respect to the outer layer, which is comprised between about $-0.40 \times 10^{-3}$ and $2.00 \times 10^{-3}$.

6. The multimode optical fiber according to claim 1, wherein the optical core's graded-index profile is an alpha graded-index profile with an alpha parameter comprised between 1.9 and 2.1.

7. The multimode optical fiber according to claim 1, wherein the optical core has a maximum, third refractive index difference $\Delta n_0$ with respect to the outer layer, which is comprised between about $11 \times 10^{-3}$ and $18 \times 10^{-3}$.

8. The multimode optical fiber according to claim 1, wherein the outer end of said depressed trench is separated from the center of the optical fiber by a radius $r_t$ lower than 32 μm.

9. The multimode optical fiber according to claim 1, having a numerical aperture of between 0.185 and 0.215.

10. The multimode optical fiber according to claim 1, wherein the optical core has a radius a, from the center of the optical fiber, comprised between about 22 μm and 27 μm.

11. A multimode optical system comprising:
at least one optical fiber, comprising:
an optical core; and
an optical cladding surrounding the optical core,
the optical core having a refractive graded-index profile,
the optical cladding comprising:
an inner layer surrounding said optical core,
an intermediate layer, called a "depressed trench", surrounding said inner layer,
an outer layer surrounding said depressed trench and having a constant refractive index,
said depressed trench having a width W and a first negative refractive index difference $\Delta n_t$ with respect to the outer layer,
wherein said depressed trench is arranged so as to satisfy the following inequality:

$$0.585677 - 114.681 \times S + 13.7287 \times S^2 + 18.7343 \times S \times W - 4.61112 \times S \times \Delta n_t.10^3 - 0.913789 \times W \times \Delta n_t.10^3 | + 2 \times W \times \Delta n_t.10^3 < -30$$

wherein:
S is the width of the inner layer, which is comprised between 0.6 μm and 1.6 μm;
$\Delta n_t$ is comprised between $-11 \times 10^{-3}$ and $-4 \times 10^{-3}$; and
$W \times \Delta n_t.10$ is lower than $-25$ μm.

12. The multimode optical fiber according to claim 5, wherein the refractive index difference of the inner layer with respect to the outer layer is comprised between about $-27 \times 10^{-3}$ to $1.19 \times 10^{-3}$.

13. The multimode optical fiber according to claim 5, wherein the refractive index difference of the inner layer with respect to the outer layer is comprised between about $-0.10 \times 10^{-3}$ and $0.60 \times 10^{-3}$.

14. The multimode optical fiber according to claim 7, wherein the maximum, third refractive index difference $\Delta n_0$ with respect to the outer layer is comprised between about $13 \times 10^{-3}$ and $16 \times 10^{-3}$.

15. The multimode optical fiber according to claim 8, wherein the outer end of said depressed trench is separated from the center of the optical fiber of a radius $r_t$ lower than 30 μm.

* * * * *